US011478060B2

(12) United States Patent
Yan et al.

(10) Patent No.: US 11,478,060 B2
(45) Date of Patent: Oct. 25, 2022

(54) COSMETIC CONTAINER COMPRISING A SURFACE WITH CONTROLLABLE TRANSPARENCY

(71) Applicant: ELC Management LLC, Melville, NY (US)

(72) Inventors: Jian Yan, Kirkland (CA); Scott Charles Roman, Smithtown, NY (US); Matthew Chateauvert, Harrison, NY (US)

(73) Assignee: ELC Management LLC, Melville, NY (US)

( * ) Notice: Subject to any disclaimer, the term of this patent is extended or adjusted under 35 U.S.C. 154(b) by 131 days.

(21) Appl. No.: 16/936,416

(22) Filed: Jul. 22, 2020

(65) Prior Publication Data

US 2022/0022627 A1 Jan. 27, 2022

(51) Int. Cl.
*A45D 40/22* (2006.01)
*A45D 42/02* (2006.01)
*A45D 33/32* (2006.01)
*A45D 40/00* (2006.01)
*G02F 1/01* (2006.01)

(52) U.S. Cl.
CPC ............. *A45D 40/22* (2013.01); *A45D 33/32* (2013.01); *A45D 42/02* (2013.01); *A45D 2040/0012* (2013.01); *A45D 2200/053* (2013.01); *G02F 1/0102* (2013.01)

(58) Field of Classification Search
CPC ........ A45D 40/22; A45D 33/32; A45D 42/02; A45D 2040/0012; A45D 2200/053; G02F 1/0102; F21V 33/0004; F21W 2131/30
See application file for complete search history.

(56) References Cited

U.S. PATENT DOCUMENTS

| | | | | | |
|---|---|---|---|---|---|
| 1,978,905 | A | * | 10/1934 | Lamb ..................... | A45D 33/32 132/288 |
| 2,021,015 | A | * | 11/1935 | Muller ................... | A45D 33/32 362/136 |
| 2,185,149 | A | * | 12/1939 | Hallbauer .............. | A45D 33/32 362/136 |

(Continued)

FOREIGN PATENT DOCUMENTS

| | | | | | |
|---|---|---|---|---|---|
| CN | 207721394 | | * | 9/2017 | ............. A45D 33/00 |
| CN | 208129720 | | * | 4/2018 | ............. A45D 33/32 |

(Continued)

OTHER PUBLICATIONS

PCT International Search Report; International Application No. PCT/US2021/042449; Completion Date: Nov. 10, 2021; dated Nov. 10, 2021.

(Continued)

*Primary Examiner* — Zheng Song
(74) *Attorney, Agent, or Firm* — Peter Giancana

(57) ABSTRACT

A cosmetic container, such as a compact, that comprises a lid hingedly connected to a base, and a lighting circuit. Some embodiments of the invention comprises a one-way mirror, while others comprise a variable transparency film. Preferred embodiments, however, comprise both a one-way mirror and a variable transparency film that work cooperatively to provide a lid that is see through when viewed from the outside, and reflective when viewed from the inside.

6 Claims, 13 Drawing Sheets

(56) References Cited

U.S. PATENT DOCUMENTS

| | | | | |
|---|---|---|---|---|
| 2,453,621 | A * | 11/1948 | Chinn | A45D 33/32 |
| | | | | 362/156 |
| 2,529,972 | A | 11/1950 | Scott | |
| 2,677,044 | A * | 4/1954 | Lawler | A45D 33/32 |
| | | | | 362/136 |
| 3,163,364 | A * | 12/1964 | Ritter | A45C 15/06 |
| | | | | D28/78 |
| 3,300,632 | A | 1/1967 | Kinn | |
| 3,851,655 | A | 12/1974 | Tarro | |
| 6,311,077 | B1 | 10/2001 | Bien | |
| 7,054,668 | B2 | 5/2006 | Endo et al. | |
| 7,311,416 | B1 * | 12/2007 | Kudma | A45D 33/22 |
| | | | | 206/823 |
| 7,481,548 | B2 * | 1/2009 | Tokushita | A45D 42/10 |
| | | | | 362/135 |
| 9,101,193 | B1 | 8/2015 | Liu | |
| 10,986,910 | B2 * | 4/2021 | Kim | A45D 42/02 |
| 2004/0020509 | A1 * | 2/2004 | Waisman | A45D 42/10 |
| | | | | 132/316 |
| 2005/0231835 | A1 * | 10/2005 | Tokushita | A45D 33/32 |
| | | | | 359/871 |
| 2007/0121315 | A1 * | 5/2007 | Lan | A45D 33/32 |
| | | | | 362/135 |
| 2009/0323319 | A1 * | 12/2009 | Lin | A45D 33/32 |
| | | | | 362/144 |
| 2010/0128204 | A1 * | 5/2010 | Omote | B32B 27/281 |
| | | | | 349/86 |
| 2011/0197913 | A1 * | 8/2011 | Chen | A45D 33/006 |
| | | | | 132/316 |
| 2016/0331101 | A1 | 11/2016 | Lewis | |
| 2017/0086560 | A1 * | 3/2017 | Pires | A45D 40/18 |
| 2017/0264118 | A1 * | 9/2017 | Miller | H02J 7/0049 |
| 2019/0150591 | A1 * | 5/2019 | Song | A45D 34/00 |

FOREIGN PATENT DOCUMENTS

| | | | | |
|---|---|---|---|---|
| CN | 207721394 U | | 8/2018 | |
| CN | 208129720 U | | 11/2018 | |
| JP | WO 2004017789 | * | 3/2004 | A45D 33/00 |
| KR | 20-0433784 | * | 12/2006 | A45C 11/16 |
| KR | 20-0433784 Y1 | | 12/2006 | |
| KR | 20170007986 | * | 1/2017 | A45D 40/00 |
| WO | WO 2022020401 | * | 1/2022 | A45D 42/02 |

OTHER PUBLICATIONS

PCT Written Opinion of the International Searching Authority; International Application No. PCT/US2021/042449; Completion Date: Nov. 10, 2021; dated Nov. 10, 2021.

Taiwan IPO Search Report from TW Application No. 110126862; dated Jan. 14, 2022.

* cited by examiner

COSMETIC CONTAINER COMPRISING A SURFACE WITH CONTROLLABLE TRANSPARENCY

FIELD OF THE INVENTION

The present invention is in the field of cosmetic containers. Specifically described is a compact that comprises at least one surface whose transparency can be controlled by a user.

BACKGROUND

Cosmetic compacts typically comprise a base and lid that are joined by a hinge feature, such as a pivot hinge. The base is usually designed as a container for holding one or more cosmetic products, makeup applicators or other personal care elements. The lid cooperates with the base to secure the contents of the base. The cooperation of the lid and base may include an airtight seal between the two, and a fastening mechanism that prevents accidental opening of the compact. The base and lid are generally the same overall shape; round, oval and rectangular being very common. Also, it is quite common for the innerside of the lid to comprise a mirror that may used when the compact is in an opened position.

Compacts that comprise a window through which the contents of the compact can be viewed when the case is in a closed position, are known. Such compacts are advantageous, because less in-store display space is necessary to adequately show the cosmetic product, and the product can be shown without exposing it to the ambient atmosphere. Examples of these include compacts with see-through lids, such as U.S. D759,896, wherein a portion of the lid is formed of a transparent material, either glass or plastic. With this type compact, however, if a mirror is provided to assist the user in applying the cosmetic product, it must be supplied separately from the transparent window element.

In contrast, a compact with a see-through base is shown in U.S. Pat. No. 5,431,177. An aperture is located in the base of the compact, and the product contents are stored in a transparent pan that overlies or fits into the aperture. The product contents can be viewed by looking through the aperture and the transparent pan. This arrangement permits a makeup mirror to be located between the cosmetic and the innerside of the lid without obstructing the view of the product contents. The disadvantage to this system is that it requires a transparent pan, which means a plastic pan, where metal pans are often preferred.

SUMMARY

The present invention is a cosmetic container, such as a compact, that comprises a lid hingedly connected to a base that houses a cosmetic product, and a lighting circuit. Some embodiments of the invention comprise a one-way mirror, while others comprise a variable transparency film. Preferred embodiments, however, comprise both a one-way mirror and a variable transparency film, cooperating as described herein.

DETAILED DESCRIPTION

In the following description, the principles of the invention are embodied in a cosmetic compact container. However, it will be readily apparent that the invention is not limited to cosmetic compacts, and the principles of the invention may be embodied in other types of containers.

First Embodiment: One-Way Mirror Only

Figure 1:
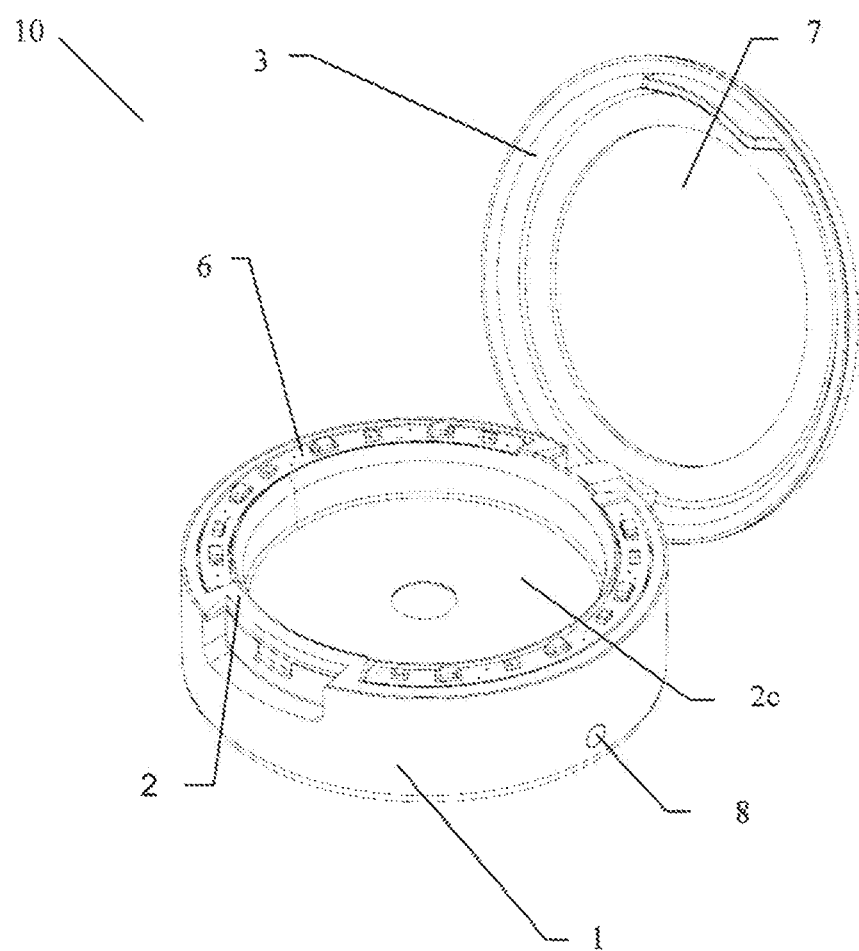
FIG. 1 is a perspective view of a first embodiment of a cosmetic compact according to the present invention, shown in an opened position.
Figure 2:
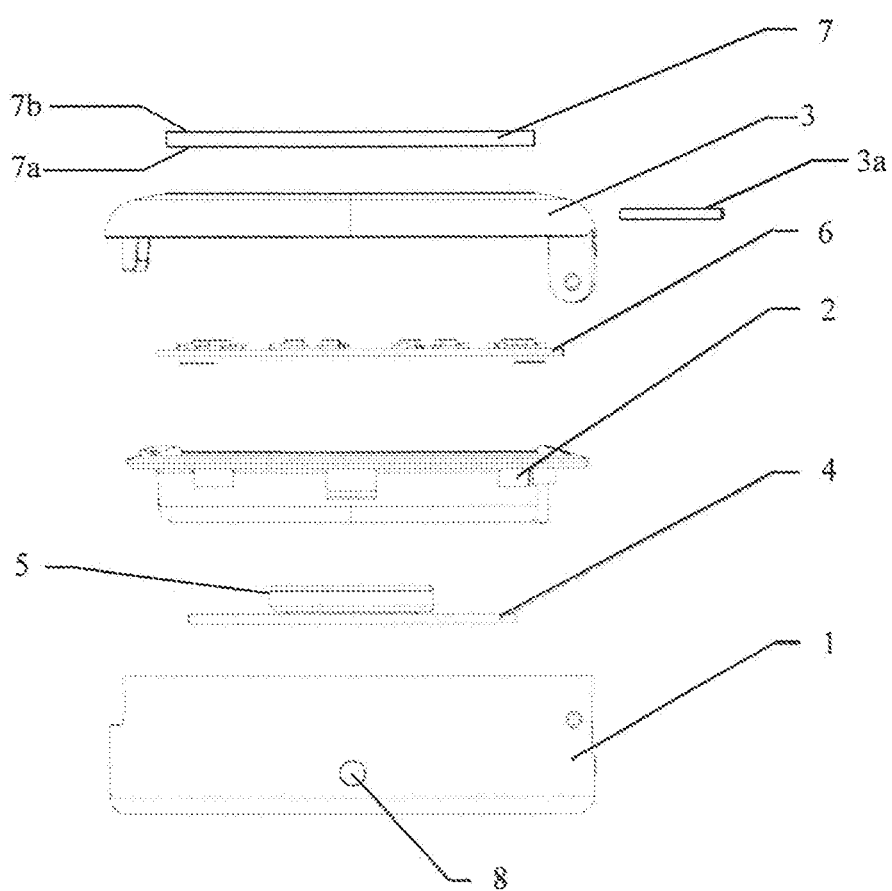
FIG. 2 is an exploded view of the cosmetic compact of FIG. 1.
Figure 3:
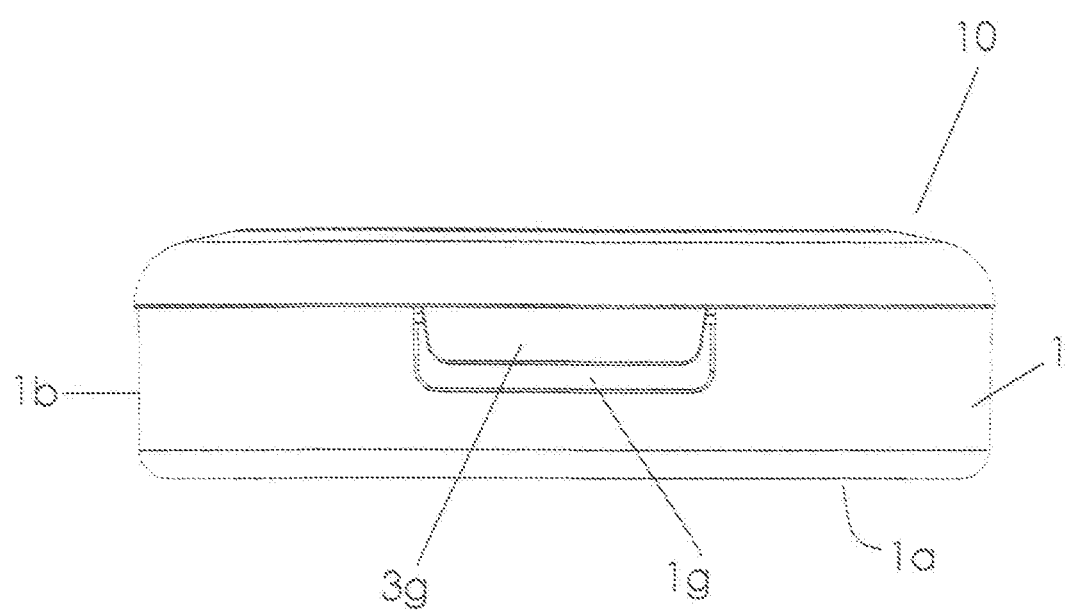
FIG. 3 is a front elevation view of a cosmetic compact according to the present invention.
Figure 4:
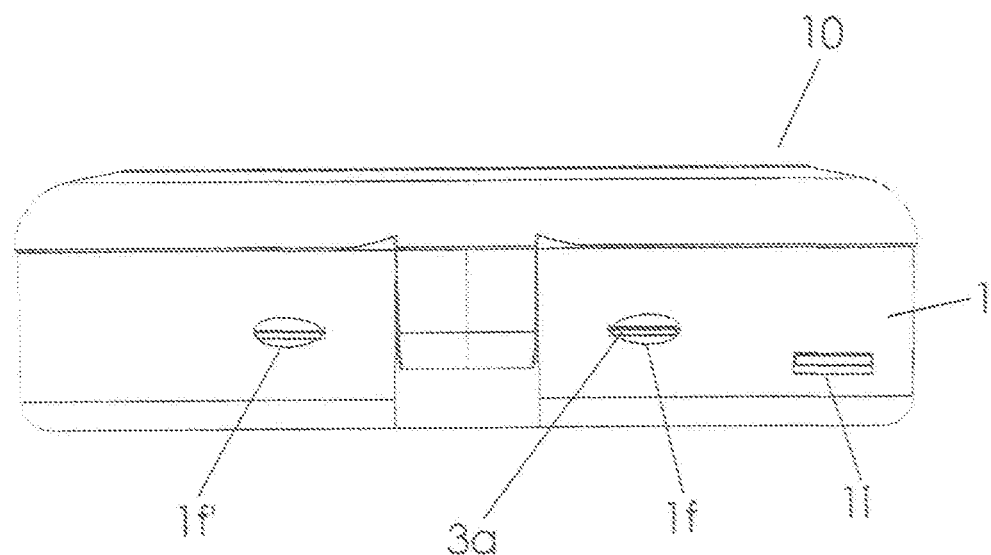
FIG. 4 is a rear elevation view of a cosmetic compact according to the present invention.

Referring to FIGS. 1 and 2, a cosmetic compact (10) according to the first embodiment of the invention comprises a base (1) with an insert (2), a lighting circuit (4, 5, 6, 8), and a lid (3) with a one-way mirror (7).

The Base and Insert

In FIGS. 1-5, the base (1) is shown as cylindrical, but the shape is not critical. The base comprises a bottom (1a) and side wall (1b), that together, define an interior (1c) of the base. One or more notches near the top of the side wall is denoted by (1e), and reference (1d) denotes one or more grooves in the side wall.

Figure 5:
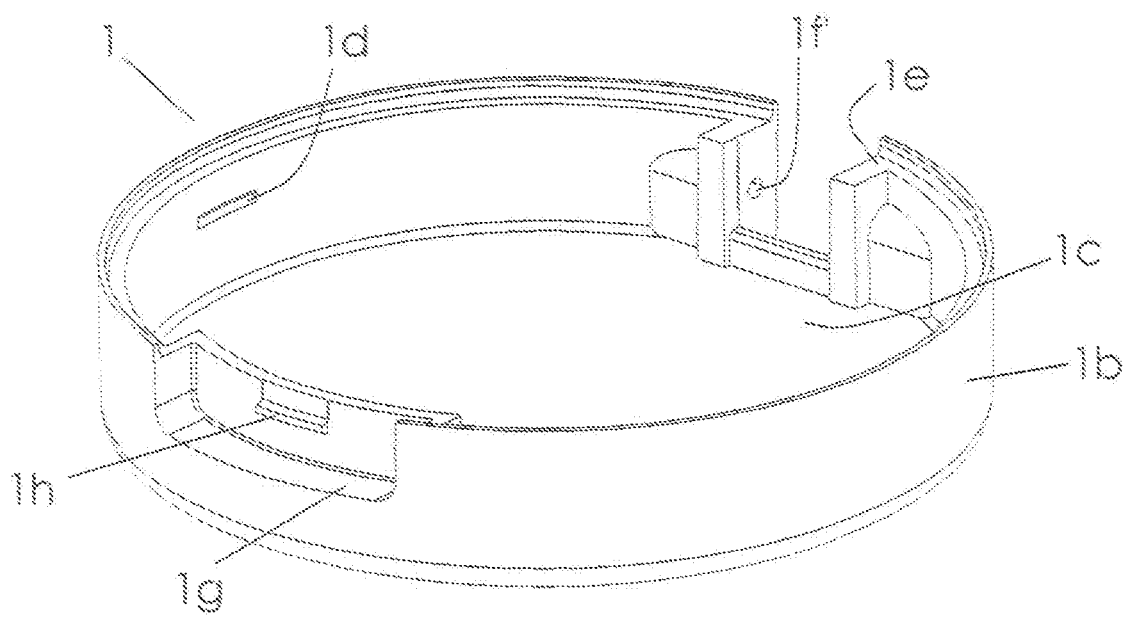
FIG. 5 is a perspective view of the base of a cosmetic compact according to the present invention.
Figure 6:
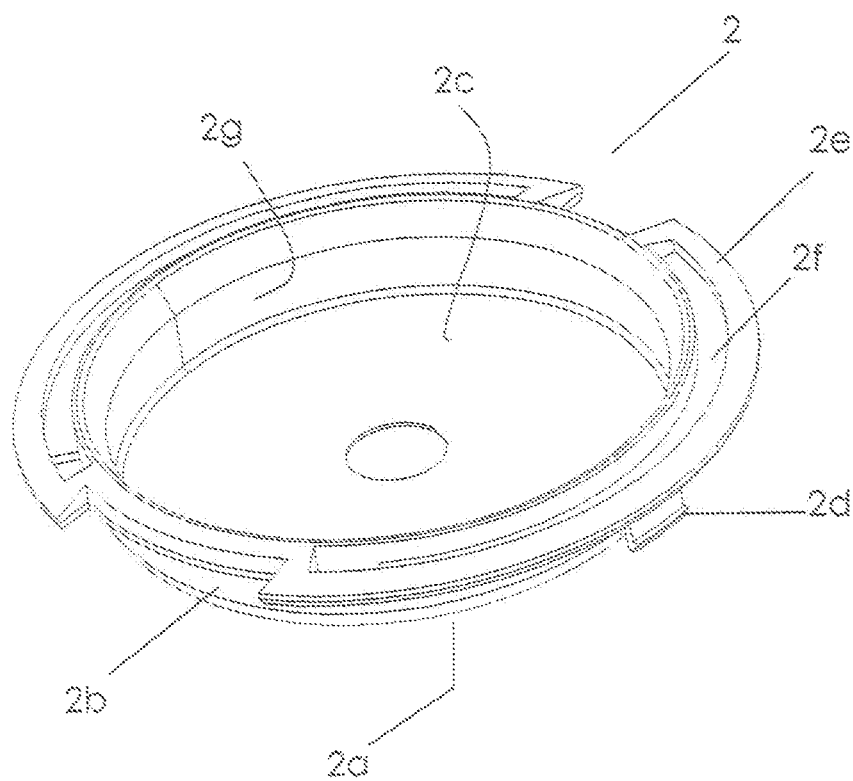
FIG. 6 is a perspective view of the insert of a cosmetic compact according to the present invention.
Figure 7:
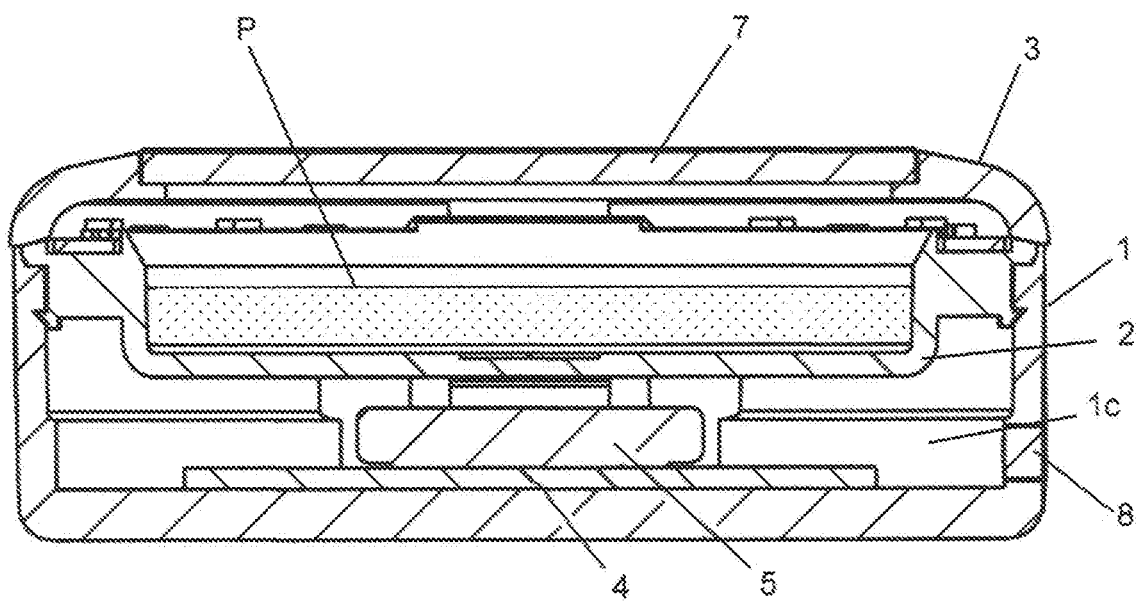
FIG. 7 is a cross sectional view of a cosmetic compact of FIG. 1, shown in a closed position.

An insert (2) is located in the interior (1c) of the base (1) of the compact (10). Referring to FIGS. 6 and 7, the insert comprises a bottom (2a) and side wall (2b) that define a reservoir (2c) for receiving a viscous cosmetic product (P). One or more flanges (2e) extend around a portion of the perimeter of the side wall of the insert, and rest in the one or more notches (1e) near the top of the side wall (1b) of the base. Each flange comprises a channel (2f). The insert may be secured in the base by adhesive and/or a snap-fit engagement. Components of a snap-fit engagement are shown in FIGS. 5 and 6, wherein one or more flexible protruding members (2d) of the insert are designed to fit into one or more grooves (1d) of the base, to prevent the insert from backing out of the base. The product (P) received into the reservoir of the insert may be, for example, a pressed powder, cream or gel. Optionally, the product may be deposited directly into the reservoir of the insert, or it may be deposited in an aluminum pan (2g) or other type of godet common in the field, which is then seated in the insert (2).

The Lighting Circuit

A lighting circuit is comprised of one or more printed circuit boards, a power source, an on/off switch and one or more arrays of lighting elements. Optionally, a means of recharging the power source is also provided. In a preferred embodiment, the interior (1c) of the base (1) houses a main printed circuit board (4) and a power source. These are located below the insert (2) (see FIG. 7). The main printed circuit board rests on the bottom of the base interior, and may be fixed there by any suitable means. The power source is preferably a battery (5). The battery may be a single use battery, such as a button cell. These include those commonly referred to as lithium, zinc-air, silver, alkaline, and nickel, which typically have a nominal voltage in the 1.4 to 3.6 volt range. Alternatively, the battery is rechargeable.

One or more arrays (6) of lighting elements (6b) are positioned to shine light on the product (P) in the reservoir (2c) of the insert (2). For example, one or more arrays of lighting elements may be supported by the insert, by locating an array of lighting elements in each channel (2f) of the insert (2), which is adapted for fixedly securing each array, either by snap-fit, interference fit or adhesive. Alternatively or additionally, one or more arrays of lighting elements could be secured along the inside perimeter of the lid (3).

Figure 8:
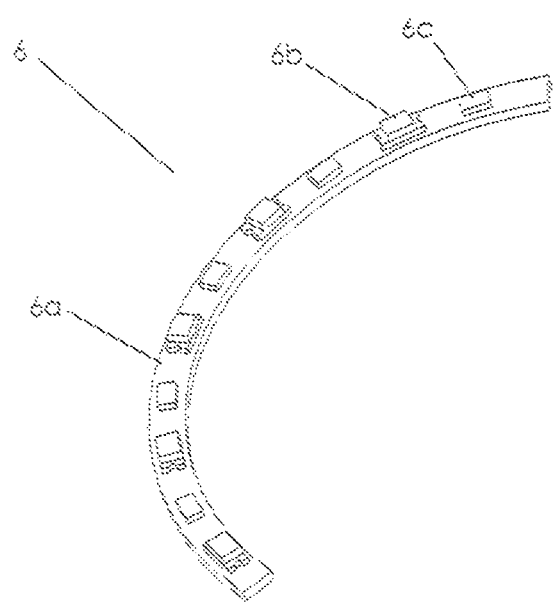
FIG. 8 depicts an array of lighting elements and resistors.

The lighting elements within each array are electrically connected to each other, preferable in parallel. Within each array, the lighting elements may be physically separate from each other, connected only by wires. Preferably, however, each array comprises a secondary printed circuit board (6a) to which the lighting elements are affixed (see FIG. 8). Preferably, at least some of the lighting elements in each array are light emitting diodes (LEDs). More preferably, all of the lighting elements are LEDs. The secondary printed circuit boards and lighting elements are able to receive power from the battery (5), via the main circuit board (4) and electrical conductors (not shown). One or more resistors (6c) are located in series or parallel with the lighting elements, as needed, to regulate current and voltage. A means of opening and closing the lighting circuit is provided. For example, this may take the form of a tactile or capacitive on/off switch (8) that is accessible to a user on the sidewall (1b) of the base (1). The switch is able to establish or interrupt the flow of electricity to the arrays of lighting elements.

Preferably, the battery (5) (or other power source) is rechargeable. When this is the case, then a means of recharging the power source is also provided. Preferred means of recharging the power source are wireless, such as magnetic inductive charging or magnetic resonance charging. With either type, a chip receiver (4a) that is able to generate an electric current by magnetic induction or magnetic resonance may be integrated into the main printed circuit board (4), so that when the compact is in range of an associated transmitter, such as a charging pad or cradle, an electric current is induced in the receiver and stored in the battery. A particularly preferred recharging means comprises Qi magnetic inductive recharging technology. Of course, recharging through a cable is also possible. In this case, internal circuitry connects the power source to a port (1i) (such as a USB) that is accessible near the surface of the compact (10).

The Lid with One-Way Mirror

A lid (3) is provided that cooperates with the base (1) to secure the contents of the base, and to control access to the interior (1c) of the base. With respect to the base, the lid may assume a closed position or an opened position. The base and lid are generally the same overall shape. The cooperation of the lid and base may include an airtight seal between the two. Typically, the base and lid are provided with means for hingedly attaching one to the other, as commonly done in the art. For example, the base and lid may be attached to each other by means of a cylindrical pin (3a) or axle that passes through a first shaft (1f) of the base, then through a shaft (3f) of the lid, and then through a second shaft (1f) of the base, so that the two components can rotate with respect to each other.

Also, provided is a fastening mechanism for latching the lid in a closed position, so that the contents of the base are protected when the compact is not in use. For example, the lid may comprises a flexible cantilever (3g) that is able to be received into a recess (1g) in the side wall (1b) of the base (see FIGS. 5 and 9). In this case, the cantilever may feature a depression (3h) that is for receiving a projection (1h) that is located in the recess (1g) of the sidewall. The shape of the projection is such that it can be removed from the depression with light pressure, provided by a user, to allow the lid to be rotated away from the base, giving access to the interior (1c) of the base.

Figure 9:
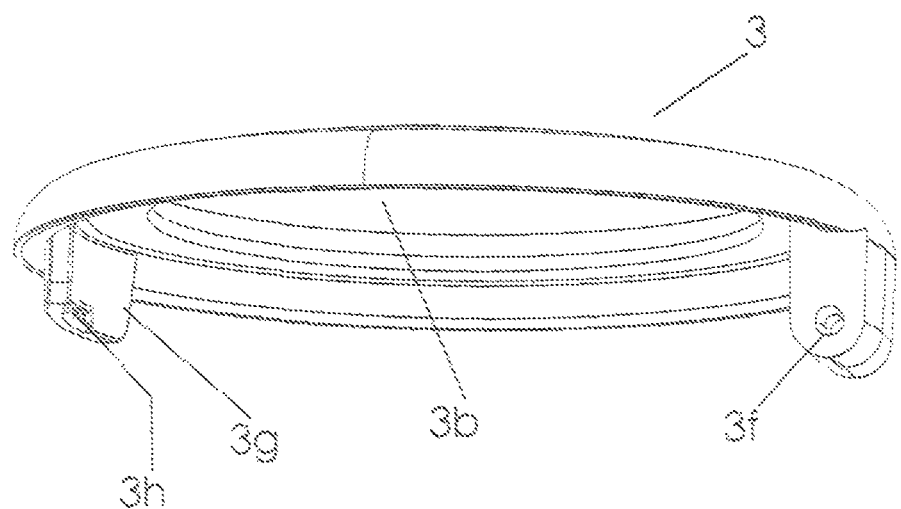
FIG. 9 depicts the lid of the cosmetic compact of FIG. 1.
Figure 12:
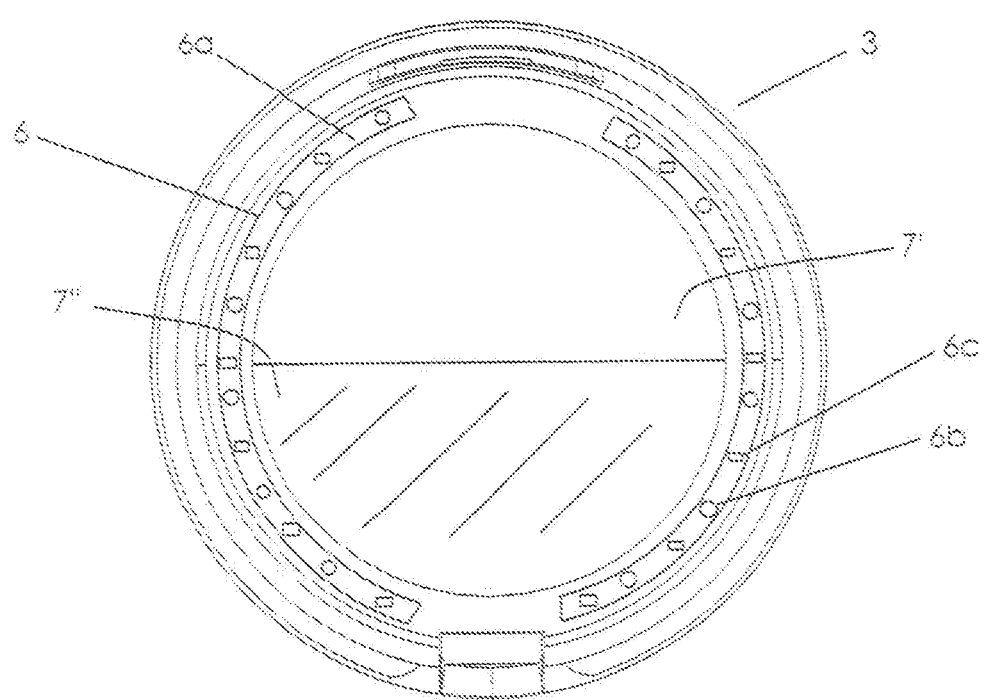
FIG. 12 depicts the lid of the cosmetic compact of FIG. 11.

Reference (3b) denotes an opening that passes through the lid (see FIG. 9). As noted above, one or more arrays of lighting elements (6) may be secured along the inside perimeter of the lid, surrounding this opening (see FIG. 12). In the opening itself, the lid (3) supports a one-way mirror (7). The one-way mirror has an inside surface (7a) that faces the interior (1c) of the base (1) when the lid is closed, and an outside surface (7b) that always faces the outside of the compact. By operating the lighting circuit, a user controls the relative brightness on opposite sides of the one-way mirror. This allows a user to view the contents of the compact (10) when the lighting circuit is on, and to hide the contents when the lighting circuit is off. For example, when the lid closed, and the lighting circuit is off, the ambient lighting outside the compact is significantly brighter than the lighting inside the compact. As a result, a user cannot see the cosmetic product inside the compact. Instead, the user would see her own reflection in the one-way mirror (7). However, when the user activates the lighting circuit by engaging the on/off switch (8), then the lighting circuit is turned on. The LEDs provide enough light energy, such that the lighting inside the compact is significantly brighter than the ambient lighting outside the compact. This renders the one-way mirror transparent to the user, and the user is able to see the product inside the compact through the lid. When the user turns the lighting circuit off, she again sees her own reflection in the one-way mirror.

Second (and Preferred) Embodiment: One-Way Mirror and Variable Transparency Film In the first embodiment just described, when the compact (10) is closed, a user can see her reflection from the outside surface (7b) of the one-way mirror (7). When the compact is opened however, she will not be able to see any reflection from either the inside surface (7a) or the outside surface of the mirror, because the ambient lighting on either side of the mirror would, in general, be of the same brightness. This is not convenient for the user who would like to see her reflection on the inside surface of the mirror as she applies the cosmetic product (P). Also, it may not be aesthetically desirable to have a reflective surface on the outside of the compact. Therefore, in preferred embodiments of the invention the outside surface of the one-way mirror is able to appear opaque even when the compact is closed and the lighting elements (6b) are off. Furthermore, in this preferred embodiment, the inside surface (7a) of the one-way mirror is able to provide a reflection even when the compact is opened, and the ambient lighting on either side of the lid (3) is the same.

Figure 10:
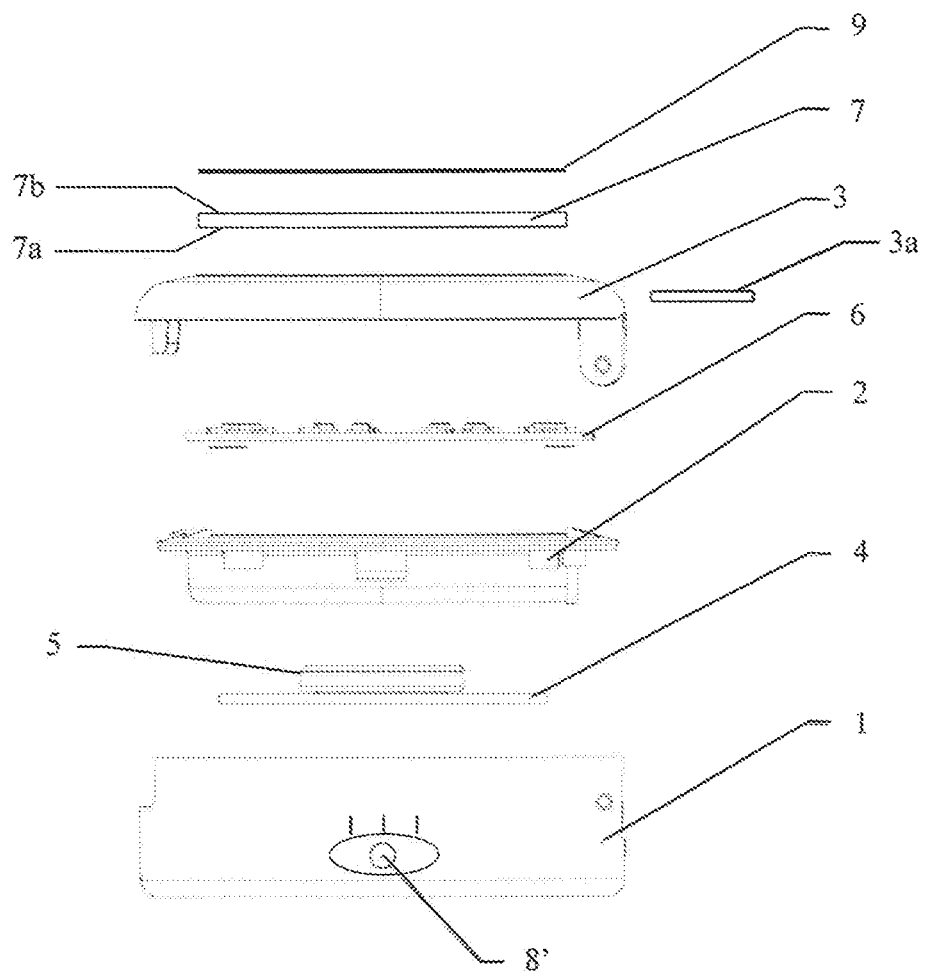
FIG. 10 is an exploded view of a second embodiment of a cosmetic compact according to the present invention.

This reversal of behavior is achieved with one addition to the first embodiment. Specifically, a variable transparency film (9) is placed onto the outside surface (7b) of the one-way mirror (7) (see FIG. 10). Variable transparency films have two opposing surfaces, and are generally opaque. However, when a specified voltage difference is maintained between the opposite surfaces of the film, then the film is rendered transparent. Preferably, the voltage is supplied by the power source (5). However, for variable transparency films, the required voltage may be significantly greater than the voltage rating of the power source. Therefore, a voltage converter (9a) that is able to boost or otherwise regulate the voltage may be integrated into the main printed circuit board (4). The power source and voltage converter are able to maintain a voltage difference between opposite surfaces of the variable transparency film that is effective to render the film transparent.

Figure 13:
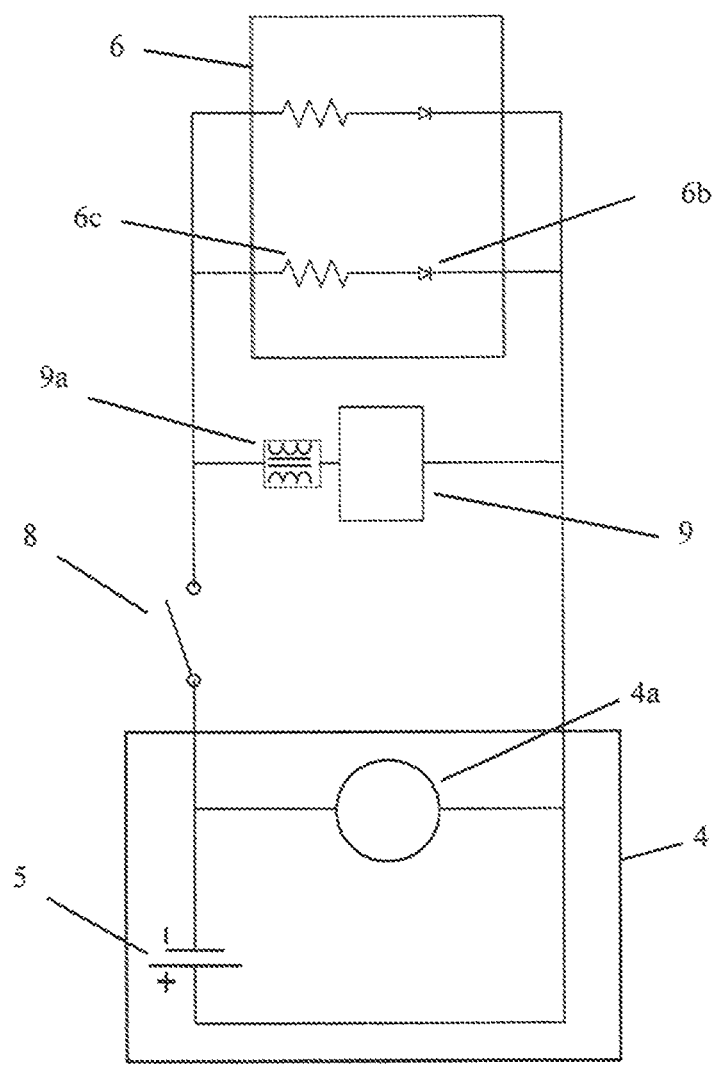
FIG. 13 is a schematic of an electrical circuit that is useful in the present invention.

In one preferred embodiment, the variable transparency film (9) and voltage converter (9a) are part of the lighting circuit, so that the specified voltage is established across the film only when the lighting circuit is on. Preferably, the variable transparency film and voltage converter are arranged in parallel with the arrays of lighting elements (6b) (see FIG. 13). In other preferred embodiments, the lighting elements and the variable transparency film are separately controllable. This could be achieved by providing separate on/off switches for the LEDs and the variable transparency film, or a single three-position switch (8'). With this option, a user can shine the LED light onto the cosmetic product even when no current is flowing to the variable transparency film.

When the lid (3) is closed, and no electric current is flowing to the lighting elements or the variable transparency film, then the variable transparency film is opaque, and the outside surface (7b) of the one-way mirror is prevented from reflecting. However, when the user causes current to flow to the lighting elements and the variable transparency film, then the variable transparency film becomes clear, and the user can view the contents of the compact through the variable transparency film and the one-way mirror, because of the increased brightness provided inside the compact (10) by the lighting elements (6b). On the other hand, when the lid (3) is opened and no electric current is flowing to the variable transparency film, then the film is opaque. This means that the outside surface (7b) of the one-way mirror is darkened, while the inside surface is lit by ambient lighting and/or by the lighting elements. As a result, the inside surface of the one-way mirror will provide a visible reflection that a user can use as she applies the cosmetic product.

Third Embodiment: Variable Transparency Film, No One-Way Mirror

Figure 11:
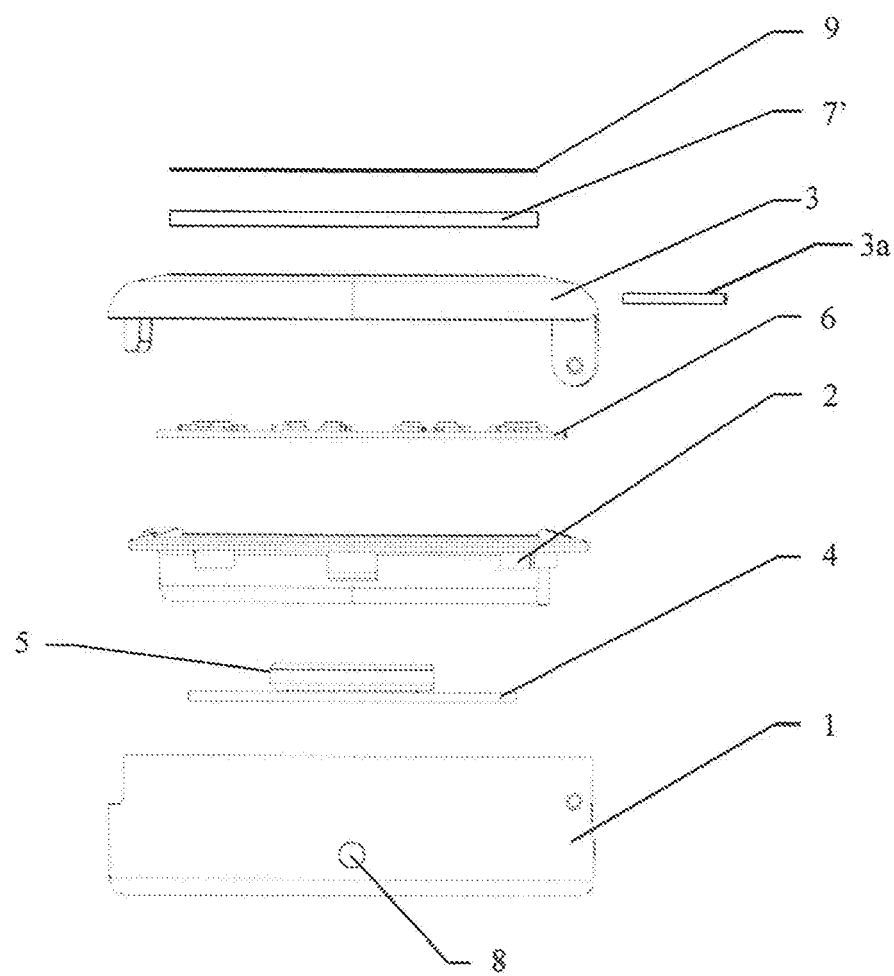
FIG. 11 is an exploded view of a third embodiment of a cosmetic compact according to the present invention.

Referring to FIG. 11, this embodiment is similar to the second embodiment, except that the one-way mirror is replaced by a transparent surface (7'), such as a piece of glass or plastic. When the lid (3) is closed, and no electric current is flowing to variable transparency film (9), then the variable transparency film is opaque, and the contents of the compact (10) cannot be viewed. When the lid (3) is closed, and an electric current is flowing to the variable transparency film, then the variable transparency film is clear, and the contents of the compact are visible through the variable transparency film and the transparent surface (7'), especially if the lighting elements (6b) are also receiving power from the power source (5). Optionally, but preferred in this embodiment, an ordinary mirror (7") is provided somewhere inside the compact to aid a user in applying the product. See, for example, FIG. 12 where half of the opening (3b) of the lid (3) is taken up by a piece of transparent glass or plastic (7'), and the other half is taken up by an ordinary mirror (7").

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cosmetic container comprising:
   a base that defines an interior;
   an insert located in the interior of the base, wherein the insert defines a reservoir for receiving a viscous cosmetic product;
   a power source;
   one or more arrays of lighting elements supported by the insert that are able to receive power from the power source;
   an on/off switch that is able to establish or interrupt the flow of electricity from the power source to the one or more arrays of lighting elements;
   a lid that is hingedly attached to the base, and able to assume a closed position or an opened position with respect to the base; and
   a one-way mirror supported in an opening that passes through the lid, the one-way mirror having an inside surface and an outside surface; wherein
      when the lid is closed, and the flow of electricity to the one or more arrays of lighting elements is interrupted by the on/off switch, then a user cannot see the cosmetic product in the base through the one-way mirror, but can see a reflection of the user in the one-way mirror in the one-way mirror; and
      when the lid is closed, and electricity is flowing to the one or more arrays of lighting elements, then the user is able to see the product in the base through the one-way mirror.

2. A cosmetic container according to claim 1 further comprising:
   a variable transparency film that is placed onto the outside surface of the one-way mirror, and
   a voltage converter,
   wherein the power source and voltage converter are able to maintain a voltage difference between opposite surfaces of the variable transparency film that is effective to render the film transparent.

3. A cosmetic container according to claim 2 wherein the power source is rechargeable.

4. A cosmetic container according to claim 3 further comprising a chip receiver that is able to generate an electric current by magnetic induction or magnetic resonance.

5. A cosmetic container according to claim 2 wherein:
   the variable transparency film is arranged in parallel with the arrays of lighting elements, and
   the on/off switch is a three-position switch, such that the lighting elements and the variable transparency film are separately controllable.

6. A cosmetic container comprising:
   a base that defines an interior;
   an insert located in the interior of the base, wherein the insert defines a reservoir for receiving a viscous cosmetic product;
   a power source;
   one or more arrays of lighting elements supported by the insert that are able to receive power from the power source;

a lid that is hingedly attached to the base, and able to assume a closed position or an opened position with respect to the base;

a transparent surface supported in an opening that passes through the lid, the transparent surface having an inside surface and an outside surface;

a variable transparency film that is placed onto the outside surface of the transparent surface, a voltage converter, wherein the power source and voltage converter are able to maintain a voltage difference between opposite surfaces of the variable transparency film that is effective to render the film transparent; and an on/off switch that is able to establish or interrupt the flow of electricity from the power source to the variable transparency film and to the one or more arrays of lighting elements.

\* \* \* \* \*